A. G. HILLSON.
LID SUPPORT.
APPLICATION FILED JULY 9, 1921.
1,409,857.
Patented Mar. 14, 1922.
2 SHEETS—SHEET 1.
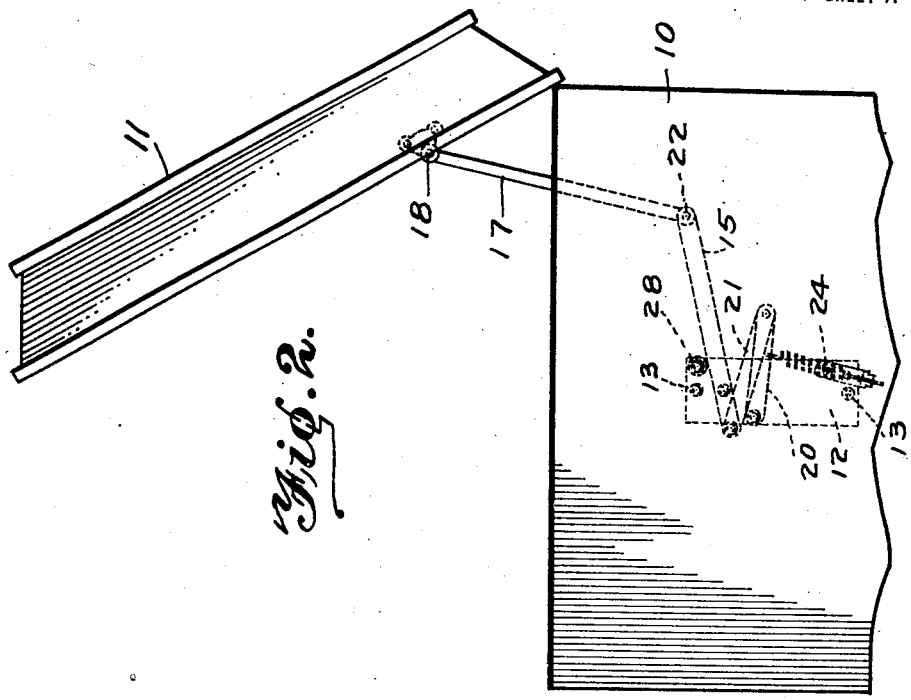
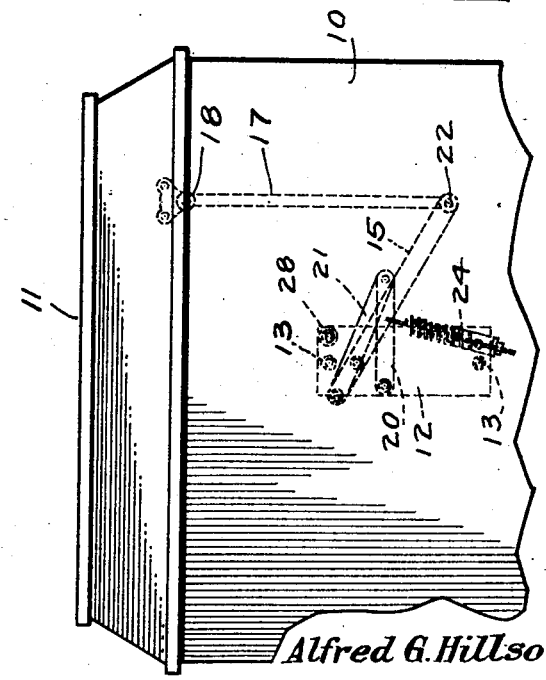
Alfred G. Hillson
INVENTOR
BY Victor J. Evans
ATTORNEY
WITNESS:

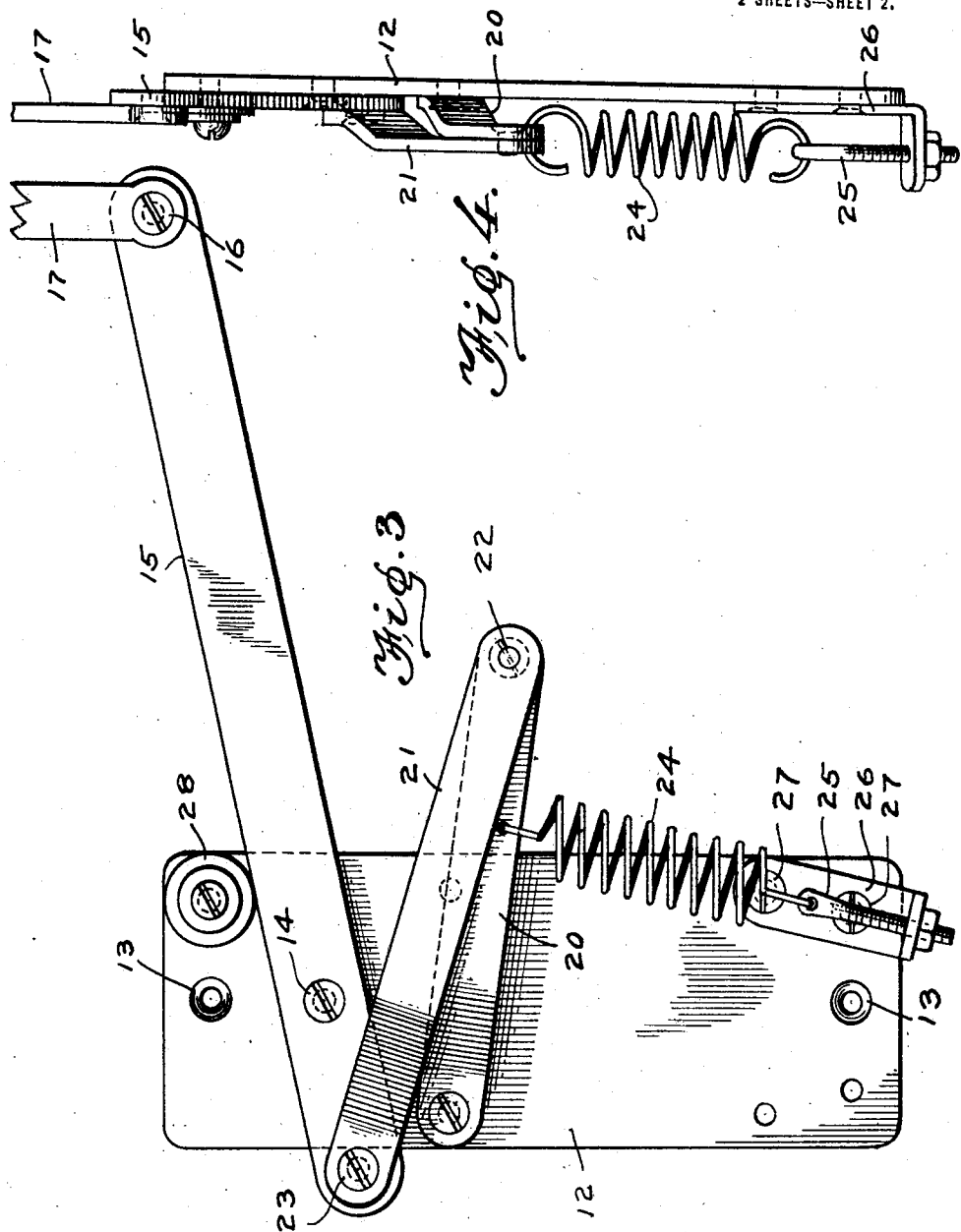

UNITED STATES PATENT OFFICE.

ALFRED G. HILLSON, OF WINDSOR, ONTARIO, CANADA.

LID SUPPORT.

1,409,857.    Specification of Letters Patent.    Patented Mar. 14, 1922.

Application filed July 9, 1921. Serial No. 483,518.

*To all whom it may concern:*

Be it known that I, ALFRED G. HILLSON, a citizen of the United States, residing at Windsor, in the Province of Ontario and Dominion of Canada, have invented new and useful Improvements in Lid Supports, of which the following is a specification.

This inventon relates to lid supporters especially designed for use in connection with cabinets, such as phonograph cabinets and the like.

An object of the present invention is the provision of a lid supporter which acts to supply power for raising the lid, the lowering operation being manually effected by a slight downward pressure.

Another object of the invention is the provision of a lid supporter which is adjustable, so as to regulate its lifting power in proportion to its load and thus insure proper and positive operation at all times.

Another object of the invention is the provision of a lid supporter which is silent in operation and which may be regulated to eliminate all noise due to contact of the lid with the body of the cabinet, the construction further relieving the lid hinges of strain by providing a support only when the lid is substantially upright.

A further object is the provision of a lid supporter which is simple in construction and operation, may be easily attached and is capable of being reversed so as to permit of its use upon either side of a cabinet.

With the above and other objects in view, the invention further includes the following novel features and details of construction, to be hereinafter more fully described, illustrated in the accompanying drawings and pointed out in the appended claims.

In the drawings:—

Figure 1 is an elevation of a phonograph cabinet with the invention applied, the view showing the cabinet as transparent. to more clearly illustrate the application of the invention.

Figure 2 is a similar view showing the position of the invention when the lid of the cabinet is elevated.

Figure 3 is an enlarged elevation of the invention per se.

Figure 4 is an edge view of the same.

Referring in detail to the drawings, wherein like characters of reference denote corresponding parts, the reference character 10 indicates the body of a phonograph cabinet, while the lid of the cabinet is shown at 11.

The invention which is capable of being attached to cabinets of various makes and designs, preferably includes a base plate 12 which is provided with openings for the passage of screws or similar fastening devices 13, to provide means for securing the invention in place. Pivotally mounted upon the base plate 12 as indicated at 14, is a lever 15. The pivotal point of this lever is located spaced from each end and one end of the lever has pivotally connected thereto as at 16, one end of a rod or link 17. The opposite end of this rod or link is pivotally connected to the lid 11 as shown at 18.

Also pivotally mounted upon the base plate 12 as shown at 19, is an arm 20, and this arm is connected to the opposite end of the lever 15 by means of a link 21, one end of this link being pivotally secured to the arm 20 as shown at 22, while the opposite end is pivotally connected to the lever 15 as shown at 23.

The arm 20 has secured thereto one end of a spring 24, while the opposite end of this spring is connected to a screw eye 25 which is adjustable within a bracket 26. This bracket is secured to the base plate 12 as shown at 27.

When the parts are in the position shown in Figure 1, the lever, arm and link are in neutral position, that is, there is neither a downward pull or an upward pressure exerted upon the lid. In order to open the cabinet, the lid is manually raised for a slight distance, sufficient to move the link 21 over the center of the pivot 14. The spring 24 will then exert a downward pull upon the short end of the lever 15, due to the arm and link connection with the lever, the particular form of connection exerting a powerful downward pull. This will elevate the opposite end of the lever 15 and cause the lid to be raised in a positive and easy manner. Upward movement of the lid is limited by means of a stop 28 which is preferably formed of rubber to provide a cushion.

By adjusting the screw eye 25, the spring may be tensioned to increase or decrease the lifting action of the device so as to regulate the same in accordance with the weight of the lid and the distance moved. If desired the device may be applied to either side of the cabinet by removing certain of the connections and replacing them in reverse position, openings for this purpose being provided in the base plate 12.

The invention is susceptible of various changes in its form, proportions and minor details of construction and the right is herein reserved to make such changes as properly fall within the scope of the appended claims.

Having described the invention, what is claimed is:—

1. The combination with a receptacle having a lid hinged thereto, of a receptacle carried lever pivotally mounted intermediate its ends, means connecting one end of said lever to the lid, a pivotally mounted spring actuated arm and a link connecting one end of said arm with the opposite end of the lever.

2. The combination with a receptacle having a lid hinged thereto, of a lid supporter embodying an attaching plate, a lever pivotally secured to the plate intermediate its ends, means connecting one end of the pivoted lever to the lid, an arm pivotally mounted upon the plate, a link connecting the arm and lever, a spring having one end connected to the pivotally mounted arm and means carried by the plate for connection with the opposite end of the spring.

In testimony whereof I affix my signature.

ALFRED G. HILLSON.